(12) United States Patent
Lee et al.

(10) Patent No.: US 11,738,549 B2
(45) Date of Patent: Aug. 29, 2023

(54) GOLD LEAF PROCESSING DEVICE AND PROCESSING METHOD

(71) Applicant: ME IN GOLD CO., LTD., Incheon (KR)

(72) Inventors: Sang Won Lee, Incheon (KR); Myung Won Lee, Incheon (KR)

(73) Assignee: ME IN GOLD CO., LTD., Incheon (KR)

( * ) Notice: Subject to any disclaimer, the term of this patent is extended or adjusted under 35 U.S.C. 154(b) by 0 days.

(21) Appl. No.: 17/312,072

(22) PCT Filed: Aug. 10, 2020

(86) PCT No.: PCT/KR2020/010529
§ 371 (c)(1),
(2) Date: Jun. 9, 2021

(87) PCT Pub. No.: WO2021/040268
PCT Pub. Date: Mar. 4, 2021

(65) Prior Publication Data
US 2023/0118916 A1    Apr. 20, 2023

(30) Foreign Application Priority Data
Aug. 27, 2019  (KR) .......................... 10-2019-0104819

(51) Int. Cl.
| | | |
|---|---|---|
| *B32B 43/00* | (2006.01) | |
| *B32B 37/00* | (2006.01) | |
| *B44C 1/14* | (2006.01) | |
| *B21D 33/00* | (2006.01) | |
| *B32B 38/10* | (2006.01) | |

(52) U.S. Cl.
CPC ............ *B32B 43/006* (2013.01); *B21D 33/00* (2013.01); *B32B 37/00* (2013.01); *B32B 38/10* (2013.01); *B44C 1/14* (2013.01); *B44C 1/145* (2013.01)

(58) Field of Classification Search
CPC ...... Y10T 29/30–301; B44C 1/14–145; B21D 33/00; B32B 37/00; B32B 37/0046; B32B 43/006; B32B 38/10
See application file for complete search history.

(56) References Cited

U.S. PATENT DOCUMENTS

| | | | | |
|---|---|---|---|---|
| 4,229,239 | A * | 10/1980 | Arai ....................... | B41M 5/025 156/277 |
| 2012/0007271 | A1* | 1/2012 | Decker ................ | C09C 1/0015 264/144 |
| 2015/0251870 | A1* | 9/2015 | Degawa ................ | B32B 38/18 156/538 |

FOREIGN PATENT DOCUMENTS

| | | | | |
|---|---|---|---|---|
| GB | 464333 | A * | 4/1937 | ............... C25D 1/20 |
| GB | 2001908 | | 2/1979 | |

(Continued)

*Primary Examiner* — Matthew P Travers
(74) *Attorney, Agent, or Firm* — Lex IP Meister, PLLC

(57) ABSTRACT

A gold leaf processing device separates gold leaf from a gold leaf fabric having a first base material attached thereto, and attaches the separated gold leaf to a second base material, the gold leaf processing device comprising: a gold leaf attaching part which dips the gold leaf fabric in an aqueous solution to allow the first base material to be sunk and separated from the gold leaf, and attaches the second base material to the gold leaf remaining, in a floating state, on the surface of the aqueous solution; and a gold leaf fabric transfer part which transfers the gold leaf fabric to the gold leaf attaching part. An associated method of using the device is also provided.

7 Claims, 12 Drawing Sheets

(56) References Cited

FOREIGN PATENT DOCUMENTS

| | | |
|---|---|---|
| JP | 1994-125719 | 5/1994 |
| JP | H6-255233 | 9/1994 |
| JP | H8-267998 | 10/1996 |
| JP | 1997-009883 | 1/1997 |
| JP | 1998-004891 | 1/1998 |
| JP | H11-42894 | 2/1999 |
| JP | H11-188427 | 7/1999 |
| JP | 2000-296577 | 10/2000 |
| JP | 3124098 | 8/2006 |
| KR | 19980051150 | 9/1998 |
| KR | 10-0188230 | 6/1999 |
| KR | 10-2010-0033055 | 3/2010 |
| KR | 101028693 | 4/2011 |

* cited by examiner (a)

(b)

(a)

(b)

(a)

(b)

GOLD LEAF PROCESSING DEVICE AND PROCESSING METHOD

TECHNICAL FIELD

The present invention relates to a gold leaf processing device and method, and more particularly, to a device and method for processing gold leaf that can be consumed by floating on tea, beverages, alcoholic beverages, and the like.

BACKGROUND ART

Due to the health benefits and luxurious image, use of gold is increasing for decorating food or consuming with food.

Previously for decoration purpose, gold leaf without any pattern is removed from base material and is simply attached or scattered to foods like ice cream, liquor, sashimi.

On the other hand, a technique of floating gold on a beverage in the form of gold leaf is known, for example, in Korean Patent No. 10-0188230. However, this technology uses the gold film produced by sputtering and accordingly requires expensive equipment and processes.

In addition, very thin gold leaf is required to be used for food. In general, edible gold leaf has a thickness of 0.1~0.2 µm.

However, when the thickness of gold leaf is about 0.1 µm thinner, the surface becomes sparse and holes are formed. On the contrary, if thicker than 0.2 µm, the cost of the product increases, which causes economic problems. A gold leaf with a thickness of about 0.1~0.2 µm transmits light of fluorescent lamp and moisture in air.

Meanwhile, the gold leaf fabric is attached to the base material by applying appropriate pressure and cut into a specific size for packaging. However, the bonding strength between the gold leaf and the base material is very weak. Accordingly, since the there is a problem of damage or deformation during handling for processing or transportation.

On the other hand, despite of weak bonding with base material, existing gold leaf absorbs water from the surface of base material which is in contact with water. As a result, even if water permeates the surface of the base material in contact with the gold leaf for a long time, the gold leaf and the base material are not easily separated.

In addition, since the base material attached to the gold leaf is not premised on edible or cosmetic use, it may contain ingredients that are harmful to the human body.

As such, there is a problem that the existing gold leaf fabric is difficult to handle and is not suitable for use for edible or cosmetic purposes.

PRIOR ART

Patent Document

Patent Document 1: Korean Patent No. 10-0188230

DETAILED DESCRIPTION OF THE DISCLOSURE

Technical Problem

An object of the present invention is to provide a device and method for processing gold leaf that can be floated in tea, beverages, liquor, etc. and is suitable for drinking or used in beauty and crafts.

In addition, the present invention is to provide a device and method capable of transferring or processing gold leaf fabric into a form that is easy to handle.

Technical Solution

The gold leaf processing device of the present invention for achieving the above object is as follows. A gold leaf processing device for separating gold leaf from gold leaf fabric having first base material attached thereto, and attaching the separated gold leaf to second base material, the gold leaf processing device comprising:

a gold leaf attaching part which dips the gold leaf fabric in an aqueous solution to allow the first base material to be separated from the gold leaf and sunk, and attaches the second base material to the gold leaf remaining in a floating state on the surface of the aqueous solution; and a gold leaf fabric transfer part which transfers the gold leaf fabric to the gold leaf attaching part.

The gold leaf attaching part may include a bath for containing the aqueous solution, a tray for receiving the gold leaf fabric provided from the gold leaf fabric transfer part, and an ultrasonic generator for applying ultrasonic waves to the aqueous solution.

The tray has an L-shaped side cross-section and is configured so that the gold leaf fabric can be placed on the bottom surface. In addition, it is preferable that the tray is divided into a plurality of spaces by side walls so that a plurality of gold leaf fabrics can be processed at the same time. Also, it is preferable that slits are formed on the bottom and vertical surfaces of the tray.

The tray is preferably coupled to the tray transfer means to be movable horizontally or vertically on the bath.

An ultrasonic generator is located below the bottom of the bath and generates ultrasonic waves to separate gold leaf of gold leaf fabric from first base material.

The gold leaf fabric transfer part is a device for transferring the gold leaf fabric to the gold leaf attaching part. Also, gold leaf fabric transfer part retrieves the first base material which is separated from gold leaf fabric.

The gold leaf fabric transfer part includes a gold leaf fabric transfer unit, a fabric storage unit, and a first base material retrieving unit.

The gold leaf fabric transfer unit adsorbs the gold leaf fabric and transfers the gold leaf fabric for subsequent processing. For processing of the gold leaf fabric, the gold leaf fabric transfer unit is transferred into the bath by the gold leaf fabric transfer unit conveying means.

The gold leaf fabric storage unit is a container in which gold leaf fabric cut into a certain size is stacked and stored.

In addition, the gold leaf fabric transfer part may further include a transfer means for transferring the gold leaf fabric transfer unit between the location of the gold leaf fabric storage unit and the bath.

The first base material retrieving unit stores the first base material which is to be discarded after separation from gold leaf fabric. It is preferable that the first base material retrieving unit is disposed between the gold leaf fabric transfer part and the bath.

It is preferable that hooks protrude from the inner walls of the first base material retrieving unit.

In addition, in the present invention, a cartridge supply part may be further included for receiving the second base material in the cartridge, and for easily and continuously providing the cartridge into the process. Also, it is preferable to further include a cartridge collecting part to continuously retrieve and collect the cartridges including the second base material to which the gold leaf is attached.

In addition, the present invention provides a gold leaf processing method comprising of the following steps to achieve the above object as follows.

The gold leaf processing method separates gold leaf from the gold leaf fabric to which the first base material is attached, and attaching the separated gold leaf to the second base material by dipping the gold leaf fabric in aqueous solution to allow the gold leaf to float on the surface of the aqueous solution and allow the first base material to be separated and sunk; and attaching the second base material to the gold leaf remaining in a floating state on the surface of the aqueous solution.

It is preferable that the first base material and the gold leaf are separated by ultrasonic waves.

In addition, the step of attaching the second base material to the gold leaf comprises providing the second base material to the aqueous solution, bringing the gold leaf into contact with second base material for attachment, and then raising the second base material and gold leaf together.

The second base material is dipped into the aqueous solution to the depth that a part of it is exposed on the water surface.

Advantageous Effects

According to the gold leaf processing device and processing method of the present invention, it is possible to effectively produce gold leaf that can be used for drinking by floating on tea, beverages, liquor, and the like or for beauty, craft, etc.

In addition, gold leaf fabric can be processed into a form that is easy to transport or handle.

In addition, the gold leaf fabric can be easily processed so that gold leaf can be combined with second base material harmless to the human body, allowing the applications such as food or beauty.

MODE FOR CARRYING OUT THE DISCLOSURE

Hereinafter, preferred embodiments of the present invention will be described with reference to the accompanying drawings. The same components in the accompanying drawings are indicated by the same reference numbers as possible. In addition, detailed descriptions of known functions and configurations that may obscure the subject matter of the invention will be omitted. Also, the drawings to facilitate the understanding of some of the components are shown exaggerated, omitted or schematically.

First, the configuration of the gold leaf processing device according to the present embodiment will be described.

Figure 1:
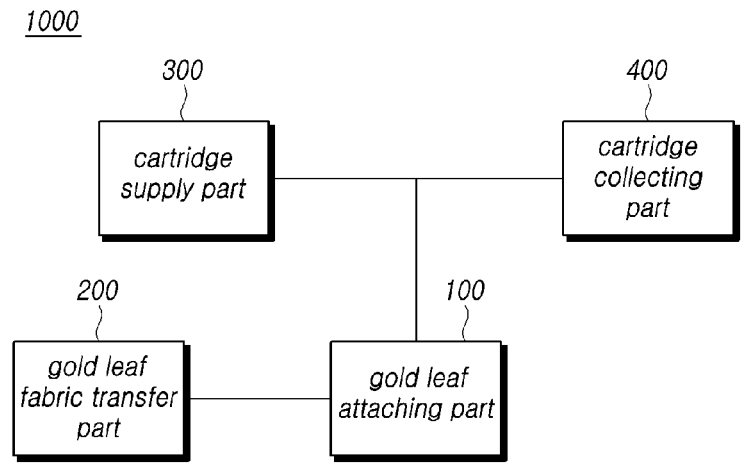
FIG. 1 is a block diagram showing the main components of a gold leaf processing device according to an embodiment of the present invention.

In FIG. 1, the gold leaf processing device 1000 is a device that separates gold leaf from the first base material of the gold leaf fabric and attaches it to the second base material. The gold leaf processing device 1000 includes a gold leaf attaching part 100, gold leaf fabric transfer part 200, a cartridge supply part 300, and a cartridge collecting part 400.

Figure 2:
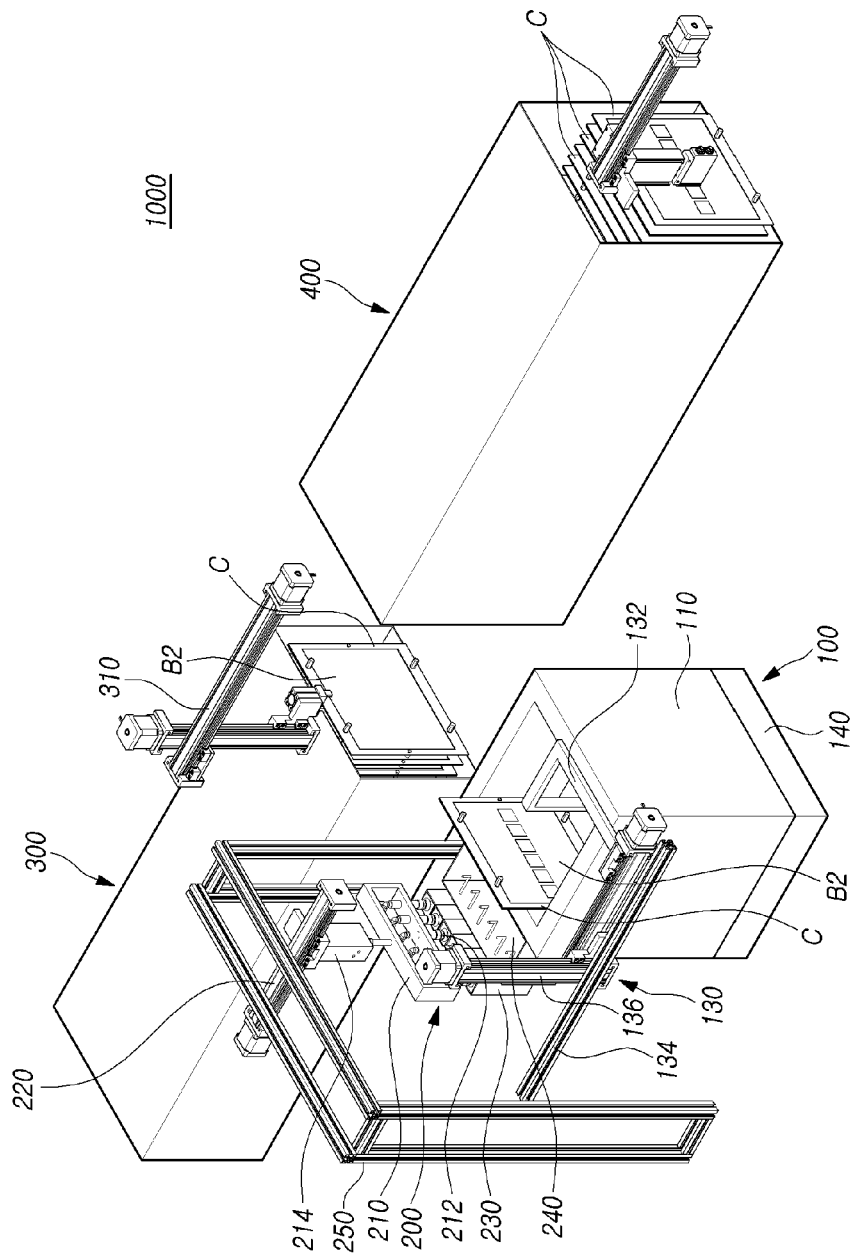
FIG. 2 is a perspective view of a gold leaf processing device according to an embodiment of the present invention.

Each component will be described in detail with reference to FIGS. 2 to 3.

The gold leaf processing device 1000 is a device to dip the gold leaf fabric in an aqueous solution W to allow the first base material to be separated from the gold leaf and sunk, and to attach the second base material to the gold leaf remaining in a floating state on the surface of the aqueous solution W.

The gold leaf attaching part 100 includes a bath 110, a tray 120, and an ultrasonic generator 140.

The bath 110 is in the form of a container in which an aqueous solution, preferably water, can be accommodated.

Figure 4:
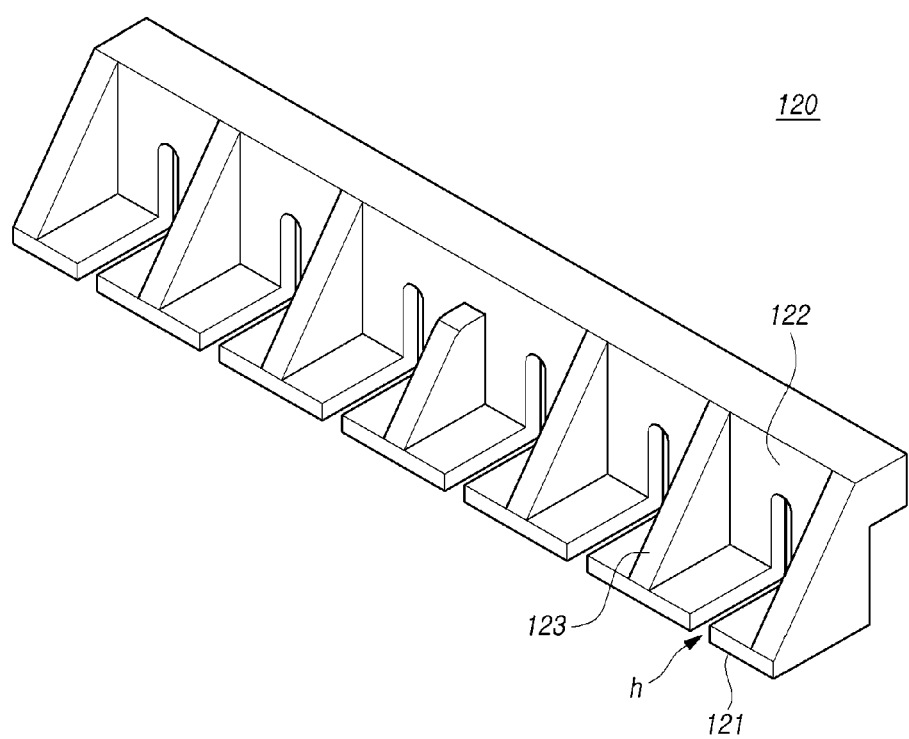
FIG. 4 is a perspective view of a tray according to an embodiment of the present invention.

In FIG. 4, the tray 120 has an L-shaped side cross-section and includes bottom surface 121, vertical surface 122, and side wall 123. During operation, the gold leaf fabric O is placed on the bottom surface 121. In the illustrated tray 120, side walls 123 are formed to separate the accommodation space so that six gold leaf fabrics O can be processed simultaneously.

In addition, a slit h is formed on the bottom surface 121 and the vertical surface 122, which is to facilitate the retrieval and disposal of the separated first base material B1.

Figure 3:
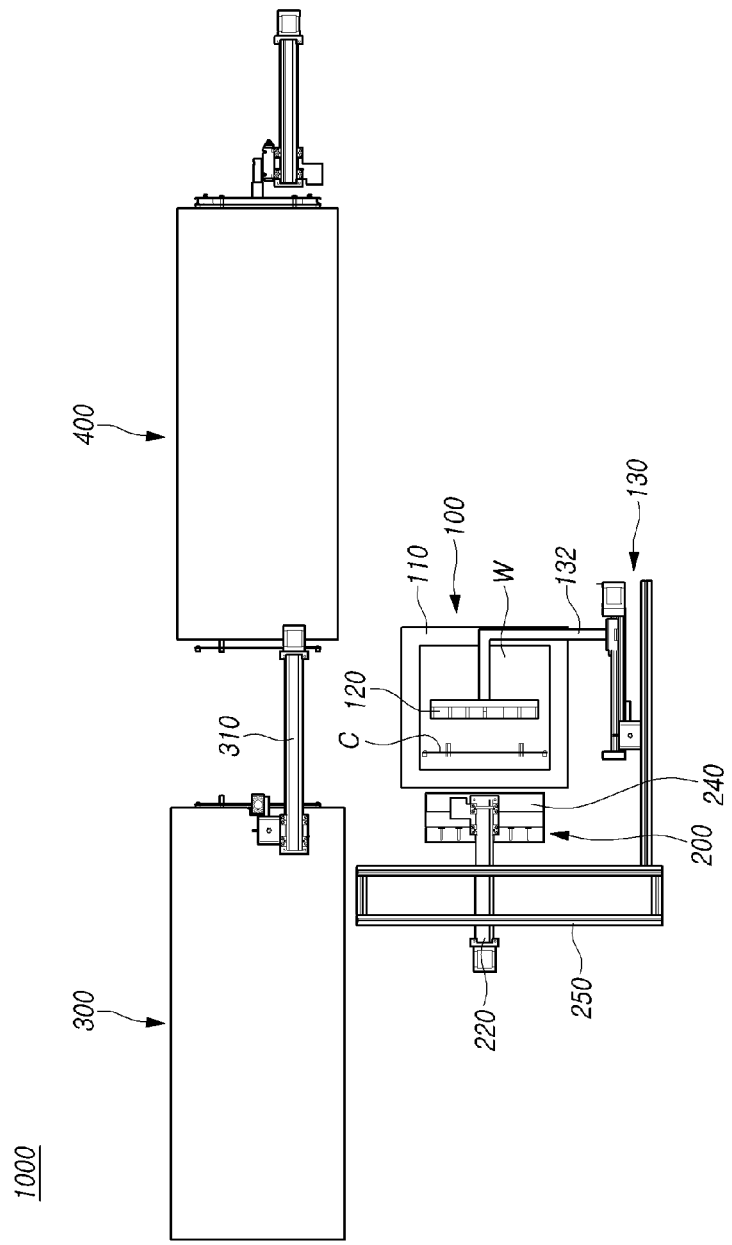
FIG. 3 is a plan view of the gold leaf processing device of FIG. 2.

In FIG. 3, the tray 120 is coupled to the tray transfer means 130 and is movable horizontally and vertically over the bath 110. In FIG. 2, the tray transfer means 130 comprises connection arm 132, horizontal tray transfer means 134, and vertical tray transfer means 136. Tray connection arm 132 is coupled with the tray 120 and can be moved by horizontal tray transfer means 134 or vertical tray transfer means 136. The horizontal tray transfer means 134 is coupled to the outer wall of the bath 110, and the vertical tray transfer means 136 is coupled to the horizontal tray transfer means 134. Each of the horizontal tray transfer means 134 and the vertical tray transfer means 136 may be driven by a motor. In this embodiment, the motor uses a stepping motor.

The ultrasonic generator 140 is located under the bath 110. The ultrasonic generator 140 is a device that generates ultrasonic waves to separate the gold leaf from the gold leaf fabric.

Gold leaf fabric transfer part 200 is located at the side of gold leaf attaching part 100 and conveys the gold leaf fabric to gold leaf attaching part 100. Also, the gold leaf fabric transfer part 200 performs a function of retrieving the first base material B1 separated from the gold leaf fabric.

Gold leaf fabric transfer part 200 comprises gold leaf fabric transfer unit 210, gold leaf fabric transfer unit conveying means 220, gold leaf fabric storage unit 230 and first base material retrieving unit 240.

Figure 5:
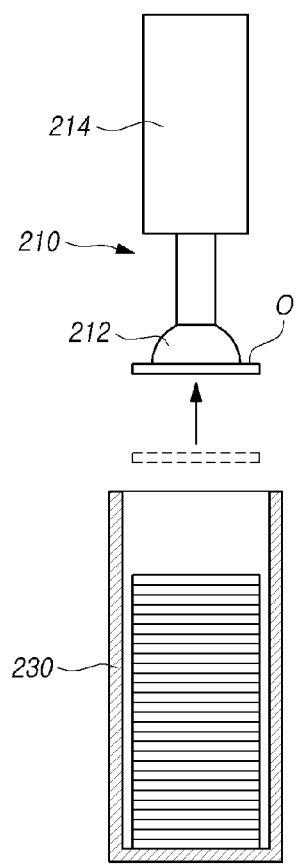
FIG. 5 is a front view schematically showing a gold leaf fabric transfer unit according to an embodiment of the present invention.

The gold leaf fabric transfer unit 210 includes an adsorption unit 212 and air cylinders 214 driving the same as shown in FIG. 5. The gold leaf fabric transfer unit 210 sucks air from the air cylinder 214. Accordingly, the gold leaf fabrics stored in the gold leaf fabric storage unit 230 are sucked up one by one to the adsorption units 212.

The gold leaf fabric transfer unit conveying means 220 transfers the gold leaf fabric O attached to the adsorption unit 212 of the gold leaf fabric transfer unit 210 into the bath 110 for processing. The gold leaf fabric transfer unit conveying means 220 is coupled to the frame 250 and includes a rail and a motor capable of moving the gold leaf fabric transfer unit 210.

The gold leaf fabric storage unit 230 is a container in which gold leaf fabric O cut to a predetermined size is stacked and stored. It is preferable that several fabric storage units 230 are arranged so that several fabrics can be processed at the same time, and in this embodiment, six fabric storage units 230 are arranged in parallel.

The first base material retrieving unit 240 has the form of open rectangular box and stores the first base material B1 which are to be discarded after processing is finished.

Figure 11:
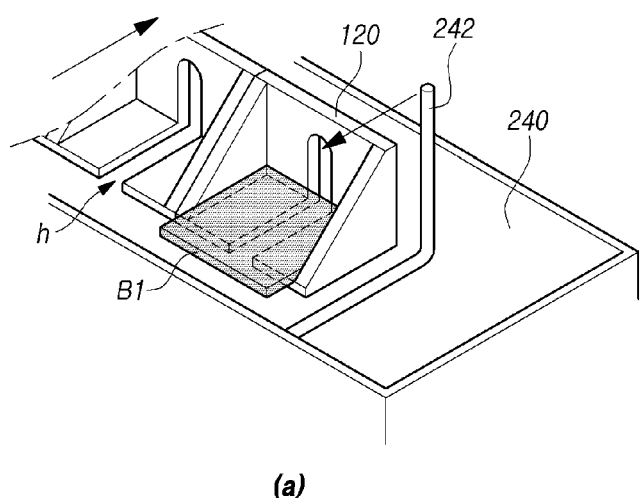
FIG. 11 is a schematic diagram showing a process in which a first base material is retrieved according to an embodiment of the present invention.
Figure 11:
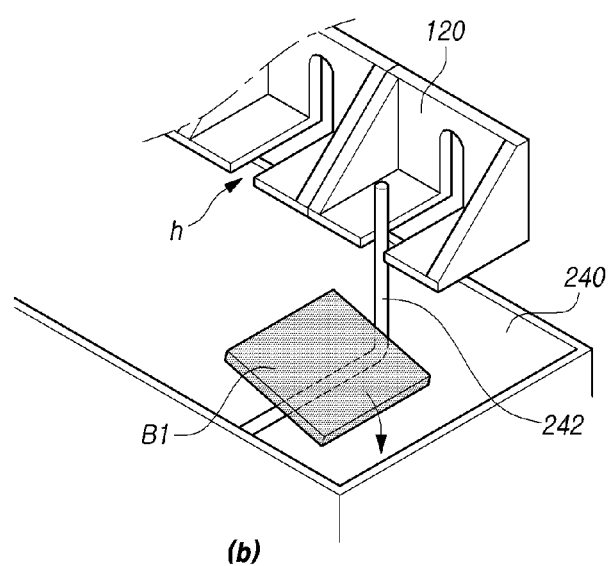

L-shaped hooks 242 protrude from the inner wall of the first base material retrieving unit 240 (see FIG. 11). The number of hooks 242 is determined to correspond to the number of spaces separated by the side wall in the tray 120, the number of adsorption units 212 and fabric storage units 230.

Cartridge supply part 300 is located at lateral and upper position of the gold leaf attaching part 100 and the gold leaf fabric transfer part 200 and supplies the gold leaf fabric transfer part 200.

The cartridge supply part 300 is an element for supplying the cartridge C including the second base material B2 to the bath 100 by the cartridge transfer means 310 to which the cartridge holder (not shown) is connected.

The cartridge collecting part 400 is an element for retrieving and storing the cartridge C having the second base material B2 to which the gold leaf G is attached.

Figure 6:
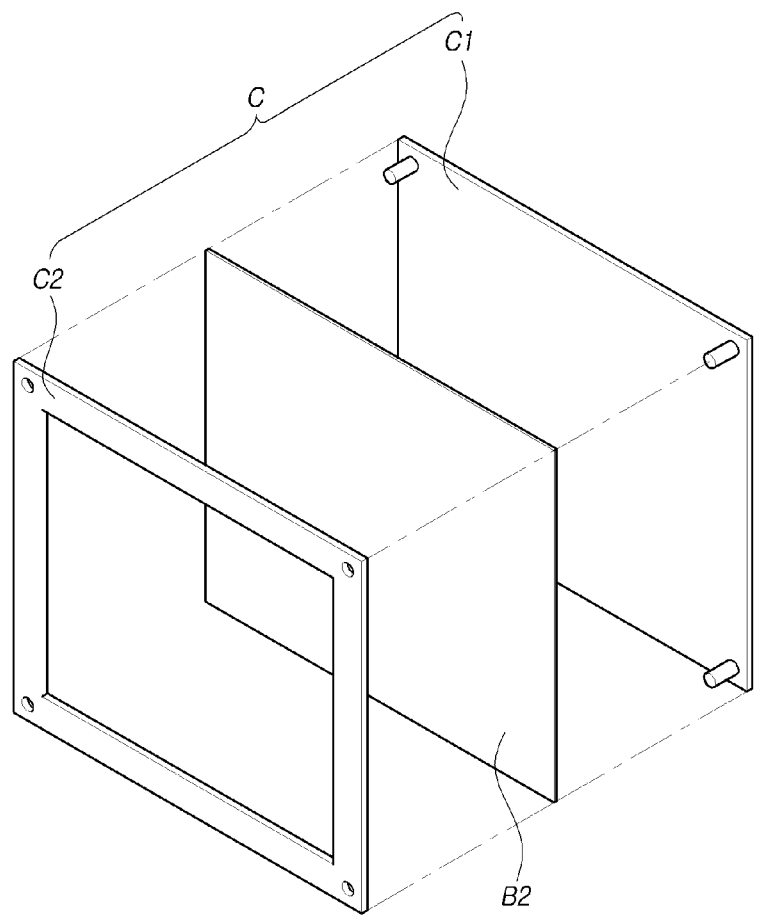
FIG. 6 is an exploded perspective view of a cartridge according to an embodiment of the present invention.

The cartridge C for handling the second base material B2 will be described with reference to FIG. 6.

The second base material B2 is coupled to the base plate C1 and the guide plate C2 of the cartridge C in a form in which the edge portion is pierced and fixed. In the illustrated embodiment, for coupling, the base plate C1 has pins at four corners and the guide plate C2 has coupling holes at four corners. The base plate C1 and the guide plate C2 are coupled with the second base material B2 being pinned between them.

However, since the illustrated embodiment is only one of various forms that can be implemented, the shape of the cartridge C may be appropriately modified according to the embodiment.

The second base material B2 is in the form of film containing paper or paper component and is composed of materials that are not harmful to the human body even if it is added to beverage. If only the second base material B2 is added to the aqueous solution W, handling becomes difficult, such as deformation occurs in the second base material B2 due to absorption of the aqueous solution W. Therefore, the second base material B2 is handled in a form coupled to the cartridge C.

Since the second base material B2 is to be put into food such as tea, beverages, alcoholic beverages, it is preferable to select paper material to which no harmful substances are added. For example, Korean paper, edible film, white paper, and washi paper can be used as the second base material B2. However, the second base material B2 is not limited to the listed materials, and it is also possible to select a material such as non-woven fabric, pure cotton, wood, PET film, and metal foil as the second base material B2.

In addition, it is preferable that coating is formed on the surface of the second base material B2. Also, it is preferable to increase the surface roughness of the second base material B2 through laser irradiation to facilitate bonding with the gold leaf G.

The operation process of this embodiment will be described as follows.

The tray 120 is positioned so that the surface of the aqueous solution W contacts with the gold leaf fabric O, and the ultrasonic generator 140 is operated to separate the first base material B1 from the gold leaf G. Then put the cartridge C containing the second base material B2 into the bath 110. And make the gold leaf G and the second base material B2 which is floating on the surface of the aqueous solution W after separation contact the cartridge. After contact, by raising the cartridge C, the gold leaf G is also raised with the second base material B2 while being attached to the second base material B2, and the attachment process is completed. Then, the cartridge collecting part 400 retrieves the second base material B2 on which the gold leaf is attached, and the cartridge supply part 300 supplies the next second base material B2 to the gold leaf attaching part 100.

Hereinafter, the gold leaf processing method according to this embodiment will be described in more detail.

The gold leaf processing method separates gold leaf from the gold leaf fabric to which the first base material is attached, and attaching the separated gold leaf to the second base material, comprising: dipping the gold leaf fabric in aqueous solution to allow the gold leaf to float on the surface of the aqueous solution and allow the first base material to be separated and sunk; and attaching the second base material to the gold leaf remaining in a floating state on the surface of the aqueous solution.

First, a step of transferring the gold leaf fabric O from the gold leaf fabric transfer part 200 to the gold leaf attaching part 100 is performed.

As shown in FIG. 5, the gold leaf fabric O is stored in a stacked state in the gold leaf fabric storage unit 230. For reference, the term gold leaf fabric used in the present disclosure means that a fabric cut to a certain size by processing the original gold leaf fabric made a gold leaf fabric manufacturer.

Here, the gold leaf processing device 1000 of the present embodiment is a form of processing six gold leaf fabrics O in parallel and has six gold leaf fabric storage unit 230. Accordingly, six gold leaf fabric transfer units 210 are also provided. However, this is only one of the possible embodiments, and the number of each component may be appropriately increased or decreased according to the number of gold leaf fabrics O to be processed at the same time according to the implementer.

The gold leaf fabric O located at the top of the gold leaf fabrics O stored in the gold leaf fabric storage unit 230 is picked up by the gold leaf fabric transfer unit 210 by adsorption.

Since the gold leaf fabric O is attached to the gold leaf fabric transfer unit 210 by air suction, more than one gold leaf fabric O may be attached in some cases. In order to prevent such malfunction, the gold leaf fabric transfer unit 210 adsorbs the gold leaf fabric O and rises to a certain height. Then a minute vibration is applied to the gold leaf fabric transfer unit 210 before leaving the gold leaf fabric storage unit 230 and accordingly gold leaf fabric O that may have been additionally adsorbed can fall off.

The adsorbed gold leaf fabric O is located at the top of the tray 120 by moving the gold leaf fabric transfer unit 210 or the tray 120. In this state, the gold leaf fabric transfer unit 210 is lowered or the tray 120 is raised to be close to each other, and the operation of the air cylinder 214 is stopped to release adsorption. Then, the gold leaf fabric O is positioned on the bottom 121 of the tray 120.

At this time, the movement of the tray 120 is made by the tray transfer means 130, and the movement of the gold leaf fabric transfer unit 210 is made by gold leaf fabric transfer unit conveying means 220. The driving method of each conveying means is not particularly limited, but in this embodiment, a method of moving along rails by driving stepping motors is employed.

Figure 7:
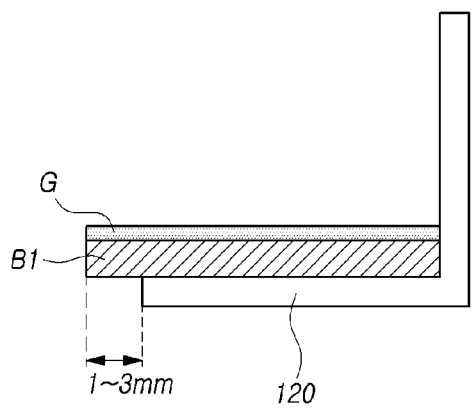
FIG. 7 is a schematic diagram showing a state in which a gold leaf fabric is placed on a tray according to an embodiment of the present invention.

The relative position of the gold leaf fabric transfer unit 210 and the tray 120 is controlled by an encoder built in the stepping motor with the control precision of 0.05 mm. Therefore, the gold leaf fabric O placed on the tray 120 by releasing of adsorption from the gold leaf fabric transfer unit 210 has its end portion protruded from the end portion of the tray 120 by about 1 to 3 mm as shown in FIG. 7.

Next, the tray 120 on which the gold leaf fabric O is placed is horizontally transferred to one end of the bath 110 and is stopped at a pre-programmed position, and then is descended into the bath 110 and is dipped.

The vertical or horizontal movement of the tray 120 in the bath is controlled to be quietly performed at a constant speed. Accordingly, since the fluctuation of water is prevented, the gold leaf fabric O on the tray 120 does not fall off or sink in water.

The descent of the tray 120 is programmed so that the gold leaf fabric O floats in contact with the water surface and the tray 120 itself stops at a position directly below the water surface. Therefore, gold leaf fabric O maintains a floating state on the water surface closely above the tray 120, while being separated slightly from the bottom of the tray 120.

This position control is performed by an encoder built in the stepping motor driving the tray transfer means 130. Since the encoder is programmed to control the motor movement with the precision of 0.05 mm level, it is possible to control the lowering position of the tray 120 in consideration of the predetermined level of the water surface. In addition, the level of water surface in the bath 110 is measured by a water level sensor, and when the level change occurs due to evaporation of water or the like, the water is supplied to maintain a constant water level. Therefore, the dipping depth of the tray 120 can be precisely controlled.

In this state, the process of separating the gold leaf G and the first base material B1 constituting the gold leaf fabric O is performed by ultrasonic waves.

That is, ultrasonic vibration is applied to the bath 110 by the ultrasonic generator 140 located under the bath 110, and as a result, the first base material B1 and the gold leaf G are separated according to the principle of the ultrasonic cleaner.

Specifically, the ultrasonic cleaner is a device that removes contaminants from an object by applying vibrations of 28 kHz, 40 kHz, 100 kHz or more by means of an ultrasonic vibrator using water as a medium. The ultrasonic cleaner operates on the principle of exfoliating and removing contaminants when fine bubbles generated by decrease and increase of pressure by the ultrasonic vibrator overcome the surface tension of the solution, shrink and explode and generate a large shock wave.

A process in which this principle is applied to the present invention will be described. Water penetrates between the first base material B1 and the gold leaf G in the gold leaf fabric O in contact with the water surface. However, in this state, as in the prior art, the gold leaf G and the first base material B1 remain unseparated. When ultrasonic vibration is applied, as shown in FIG. 8(*a*), the water penetrated between the first base material B1 and the gold leaf G vibrates finely to generate air bubbles, and as a result, the base material B1 is separated from the gold leaf G.

If the temperature of water is maintained at 60~70° C., gold leaf can be separated more quickly.

Figure 8:
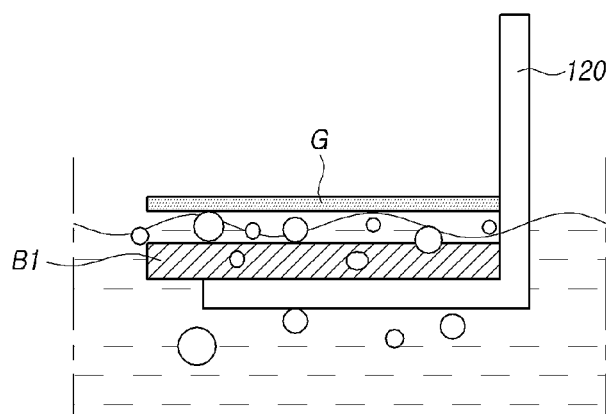
FIG. 8 is a schematic diagram showing a process in which a gold leaf fabric placed on a tray is separated into a gold leaf and a first base material by ultrasonic waves according to an embodiment of the present invention.
Figure 8:
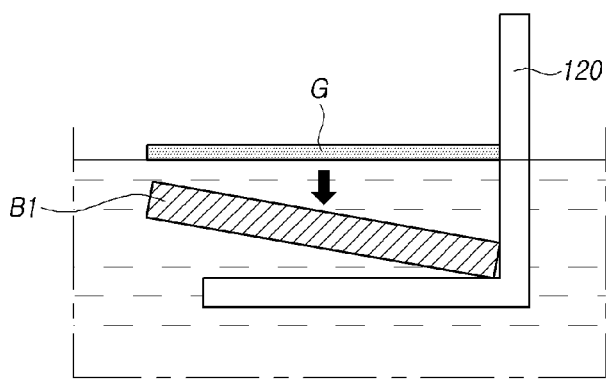

The separated first base material B1 is settled down by its own weight as shown FIG. 8(*b*) and is placed on the surface of the tray 120. On the other hand, the gold leaf G maintains a state of floating on the water surface above the tray 120 because its surface area is large and the weight is light.

After the gold leaf G is separated in this way, the operation of combining the gold leaf G with the second base material B2 is then performed.

First, the cartridge C to which the second base material B2 is attached is put into the aqueous solution W. The cartridge C may be put into the aqueous solution W before the tray 120 is put into the bath 110. This is preferable because the fluctuation of the water surface during the input of the cartridge C is not transmitted to the separated gold leaf G so that the gold leaf G does not sink.

The cartridge C is attached to the cartridge transfer arm (not shown) connected to the cartridge transfer means 310 is introduced into the bath 110. Specifically, the cartridges C are stored in cartridge supply part 300 which is located at the side upper position of gold leaf attaching part 100 and gold leaf fabric transfer part 200, and one of the cartridges C is withdrawn from the cartridge supply part 300 by a constant pitch by cartridge transfer means 310. Then, the cartridge C is put into the bath 110 by a downward motion of the cartridge transfer means 310. The detailed configuration and process for transferring the cartridge C may be performed using a known technology, and thus the explanation will be omitted.

At this time, the cartridge C is put into the bath 110 at a depth at which the portion of the second base material B2 to which the gold leaf G will be attached is dipped in the bath, and this depth is determined by motor and encoder which operates the cartridge transfer means 310.

The dipping angle of the cartridge C is about 90° to the water surface in this embodiment, but the angle is not limited to this angle and may be dipped at an inclined angle.

Figure 9:
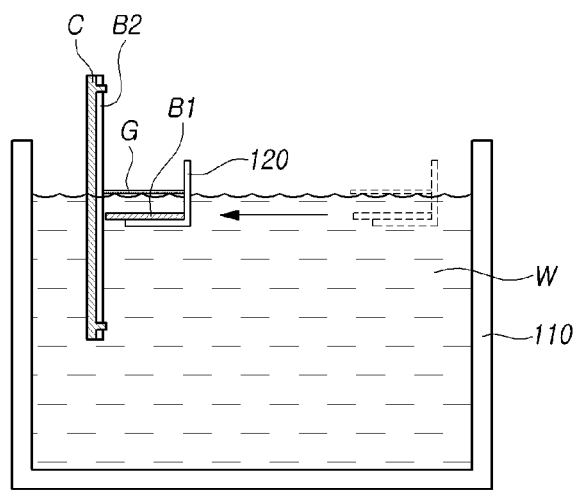
FIG. 9 is a schematic diagram showing a process of attaching gold leaf to a second base material according to an embodiment of the present invention.
Figure 9:
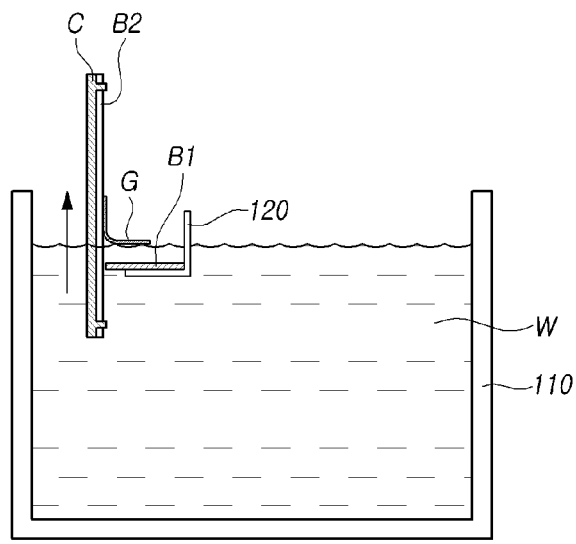

In this state, as shown in FIG. 9(*a*), by tray transfer means 130, the tray 120 is moved horizontally toward the cartridge C while maintaining a state in which the gold leaf G floats on the water surface. In the drawings, in order to facilitate explanation, the guide plate C2 is omitted from the side of the cartridge C so that the side of the second base material B2 is exposed.

When the tray 120 reaches to a position at which the gold leaf G protruded from the tray 120 contact the surface of the second base material B2, the movement of the tray 120 is controlled to stop. Since the position of the tray 120 before transport and the position of the cartridge C dipped into the bath 110 are set in advance, the transport distance of the tray 120 can be precisely controlled.

After the tip of the gold leaf G contacts the surface of the second base material B2, the cartridge C to which the second base material B2 is attached is gradually raised as shown in FIG. 9B. At this time, since the second base material B2 is in a wet state, the gold leaf G of which tip is in contact with the second base material B2 is also raised together with the second base material B2. As gold is a metal having excellent ductility, and in the present invention and is the form of very thin foil, it naturally deforms as the second base material B2 rises. That is, the gold leaf G is folded to vertical direction from horizontally lying state on the water surface and rises while being attached to the surface of the base material B2.

Figure 10:
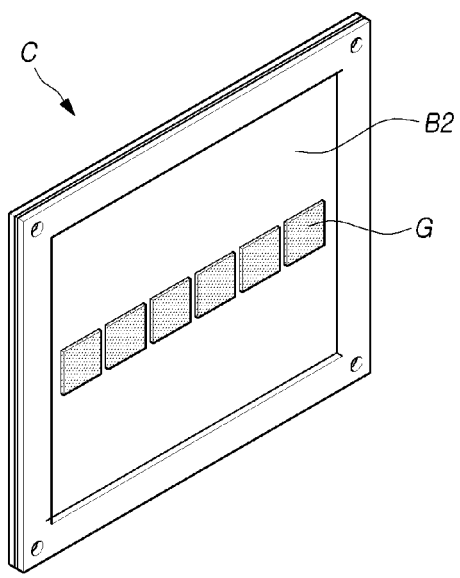
FIG. 10 is a perspective view of a cartridge combined with a gold leaf and a second base material according to an embodiment of the present invention.

When the cartridge C continues to rise, the gold leaf G is entirely attached to the second base material B2 by the action of water. As described above, the cartridge C to which the gold leaf G is attached to the second base material B2 is shown in FIG. 10.

The cartridge C to which the gold leaf G and the second base B2 are attached continues to rise and is accommodated in the cartridge collecting part 400. Thereafter, the cartridge C undergoes drying process by infrared rays and hot air, and finally, an object of combined gold leaf G and second base material B2 is obtained.

The first base material B1 separated from the gold leaf G by ultrasonic absorbs the aqueous solution W and sink on the bottom surface 121 of tray 120 by its own weight. This may be an obstacle for the next process. Therefore, it is necessary to retrieve the first base material B1.

To this end, the first base material retrieving unit 240 functions to discharge and retrieve the first base material B1 left on the tray 120, and the process is shown in FIG. 11.

In the drawing, the first base material retrieving unit 240 has the shape of a square box including L-shaped hook 242. Meanwhile, slits h are formed in the tray 120.

As shown in FIG. 11(a), after the cartridge C is raised, the tray 120 moves toward the first base material retrieving unit 240 and the hook 242 is inserted to the slit h of the tray 120. Accordingly, only the first base material B1 placed on the bottom surface 121 of the tray 120 is caught by the hook 242 of the first base material retrieving unit 240 and is prevented from moving.

Therefore, the first base material B1 is removed from the tray 120 and placed on the hook 242 as shown in FIG. 11(b). Since the hook 242 has the shape of wire that is thinner than the area of the first base material B1, the first base material B1 does not remain on the hook 242 and falls to be accommodated in the retrieving unit 240.

In order to facilitate the fall of the first base material B1, vibration may be applied by connecting a motor to the first base material retrieving unit 240 or the hook 242.

As such, when one cycle of the entire process is completed, each component is transferred to its original position to perform the next operation. Accordingly, a process of attaching the gold leaf G and the second base material B2 may be continuously performed.

A specific pattern can be formed on the produced gold leaf. Then the gold leaf is combined with a carrier and packed for sale.

Figure 12:
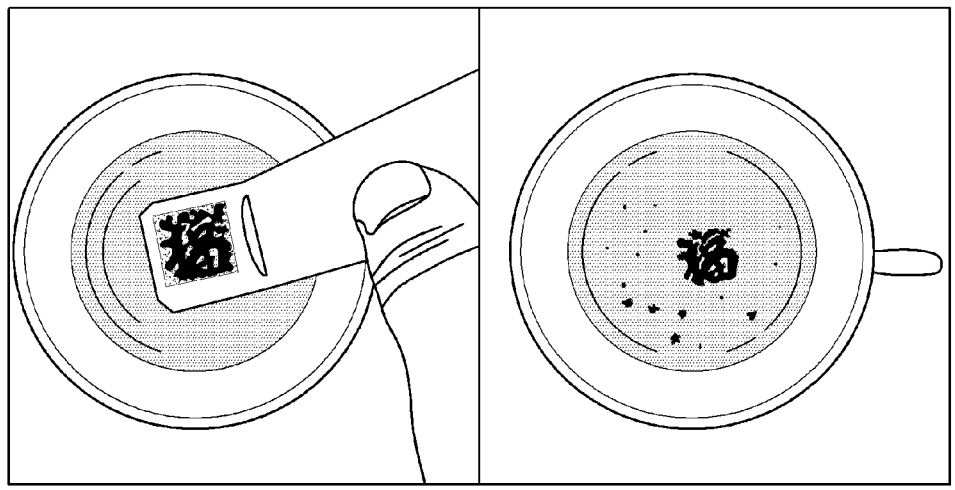
FIG. 12 is an illustration showing the example use of gold leaf processed by one embodiment of the present invention.

FIG. 12 is an illustration showing a usage example of the gold leaf produced according to an embodiment of the present invention.

As shown in the left illustration of FIG. 12, the gold leaf G combined with the second base material B2 is placed on the surface of the tea using a carrier. Then the carrier is removed. Thereafter, the second base material B2 is separated and sinks, and only the gold leaf G floats on the tea as shown on the right illustration. In this state, the gold leaf G can be drunk with the tea.

The present invention has been described by a preferred embodiment, which is a specific example to describe the present invention and is not intended to limit the scope of the present invention. It is apparent to those of ordinary skill in the art that other modifications based on the technical idea of the present invention may be implemented in addition to the embodiments disclosed herein.

EXPLANATION OF REFERENCE NUMERALS

1000: gold leaf processing device, 100: gold leaf attaching part
200: gold leaf fabric transfer part, 300: cartridge supply part
400: cartridge collecting part

CROSS-REFERENCE TO RELATED APPLICATION

This application claims priority from and the benefit under 35 U.S.C. § 119(a) of Korean Patent Application No. 10-2019-0104819, filed on Aug. 27, 2019, which is hereby incorporated by reference for all purposes as if fully set forth herein. Also, when this application claims the priority benefit of the same Korean Patent Applications from countries in addition to the U.S., the disclosure will be incorporated herein by reference.

The invention claimed is:

1. A gold leaf processing device for separating gold leaf from gold leaf fabric having first base material attached thereto, and attaching the separated gold leaf to second base material, the gold leaf processing device comprising:
   a gold leaf attaching part which dips the gold leaf fabric in an aqueous solution to allow the first base material to be separated from the gold leaf and sunk, and attaches the second base material to the gold leaf remaining in a floating state on the surface of the aqueous solution; and
   a gold leaf fabric transfer part which transfers the gold leaf fabric to the gold leaf attaching part.

2. The gold leaf processing device of claim 1,
   wherein the gold leaf attaching part comprises,
   a bath for containing the aqueous solution,
   a tray for receiving the gold leaf fabric provided from the gold leaf fabric transfer part; and
   an ultrasonic generator for applying ultrasonic waves to the aqueous solution.

3. The gold leaf processing device of claim 2,
   wherein the gold leaf fabric transfer part comprises,
   a gold leaf fabric storage unit for accommodating the gold leaf fabric; and
   a gold leaf fabric transfer unit to withdraw the gold leaf fabric from the gold leaf fabric storage unit and to transfer the gold leaf fabric to the bath.

4. The gold leaf processing device of claim 3,
wherein the gold leaf fabric transfer part comprises a first base material retrieving unit for retrieving the first base material separated from the gold leaf fabric.

5. A method of separating gold leaf from gold leaf fabric to which first base material is attached, and attaching the separated gold leaf to second base material using the gold leaf processing device of claim 1, the method comprising:
dipping the gold leaf fabric in aqueous solution to allow the gold leaf to float on the surface of the aqueous solution and allow the first base material to be separated from the gold leaf and sunk; and
attaching the second base material to the gold leaf remaining in a floating state on the surface of the aqueous solution.

6. The method of claim 5,
wherein the separation of the first base material and the gold leaf is performed by ultrasonic waves.

7. The method of claim 5,
wherein the step of attaching the second base material to the gold leaf comprises:
providing the second base material to the aqueous solution, bringing the gold leaf into contact with second base material, and then raising the second base material and gold leaf being attached to the second base material together.

* * * * *